HEAT EXCHANGE APPARATUS

Filed Oct. 29, 1963

INVENTOR.
ALLAN R. CURLL, JR.
BY
Harry W. Hargis III
AGENT 3,222,580
Patented Dec. 7, 1965

3,222,580

HEAT EXCHANGE APPARATUS

Allan R. Curll, Jr., Ardmore, Pa., assignor to Philco Corporation, Philadelphia, Pa., a corporation of Delaware Filed Oct. 29, 1963, Ser. No. 319,868
7 Claims. (Cl. 317—234)

This invention relates to heat exchange apparatus, and more particularly to apparatus for cooling semiconductive devices and the like by a combination of thermal radiation, convection and conduction.

Semiconductive devices such as transistors are relatively small and lend themselves to use in electronic component subassemblies of relatively small size and mass. However, due to their small size, semiconductive devices operating at high power levels tend to overheat. This condition is of course undesirable and in effect defeats certain advantages inherent in relatively small electronic subassemblies.

It is an object of this invention to provide simple and effective means for cooling transistors and other semiconductive devices.

It is another object of the invention to provide compact, efficient, and easily installed heat dissipating apparatus for transistors and other semiconductive devices.

It is a further object of the invention to provide cooling apparatus which is easily detachable from the semiconductive device to be cooled.

In achievement of the foregoing and other objectives, the invention contemplates heat dissipating apparatus for a semiconductive device, said apparatus having a cylindrical or tubular casing, comprising an elongated, hollow, generally cylindrical or tubular member of thermally conductive flexible and resilient material comprised of confronting semi-cylindrical sections, each section having diametrically opposed, radially outwardly extending flanges confronting like flanges of the other section to form adjacent flange pairs. One pair of the confronting flange pairs are joined, and spacer means maintain the other of the confronting flange pairs slightly apart, which spacer means is disposed intermediate the ends of the generally cylindrical member. One end of the semicylindrical sections are capable of being flexed apart, about said spacer means as a pivot, in response to moving the other end of the semicylindrical sections together. The interconnection of the pair of flanges is hinge-like in providing the resilient restoring force opposing such flexure, and consequently provides a frictional force holding the parted semi-cylindrical sections against the cylindrical casing of a semiconductive device about which the sections are placed.

From the foregoing as well as from what follows it will be appreciated that the novel cooling apparatus is adjustable to semiconductive devices of various sizes.

The foregoing and other objectives of the invention will be more fully appreciated from a consideration of the following description, taken in light of the accompanying drawing in which.

Figure 1:
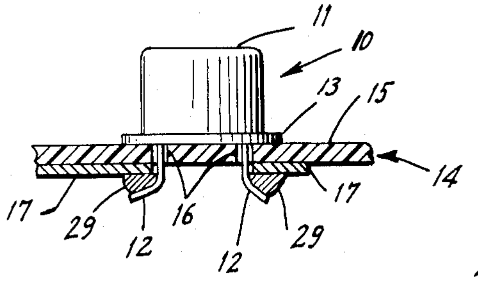
FIGURE 1 is an elevational view, partly in section, illustrating a semiconductive device of a type requiring cooling and which is shown mounted upon a printed wiring panel.
Figure 2:
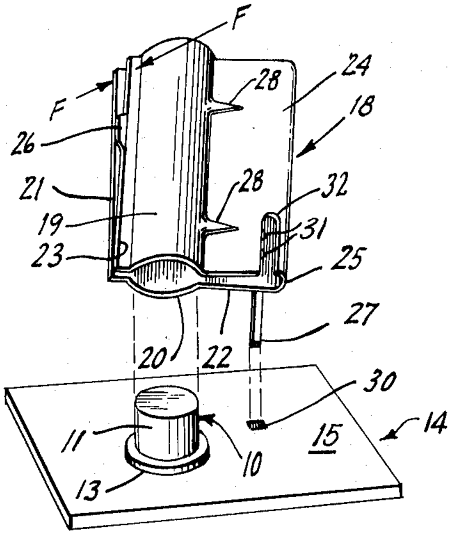
FIGURE 2 is an exploded view, in perspective, of a preferred embodiment of the heat dissipating apparatus aligned for use with the semiconductive device illustrated in FIGURE 1.

With more particular reference to the drawing, and first with reference to FIGURES 1 and 2, a semiconductive device 10, such for example as a power transistor to be cooled, includes a cylindrical housing 11 from which at least a pair of lead wires 12 extend. The flanged base portion 13 of the housing 11 rests upon the insulative board 15 of a printed wiring circuit panel 14 and the lead wires 12 extend through apertures 16 in the board 15 and are bent toward metallic circuit elements 17 disposed to the opposite side of the board 15. Electrical connection of lead wires 12 to circuit elements 17 is made by means of solder 29.

While base portion 13 of housing 11 is shown resting atop the printed wiring panel, it is to be understood that a very small space may be provided between the panel and the base portion. Although only a pair of lead wires 12 have been shown, it will be recognized that this number may vary according to the nature of the device within housing 11. However, it will be appreciated that due to the relatively small diameter of wires 12 relatively little heat is conducted therethrough for flow into the metallic circuit elements 17 disposed across the bottom of the panel. Virtually no heat is conducted from housing 11 itself to the thermally and electrically insulative board 15.

Figure 3:
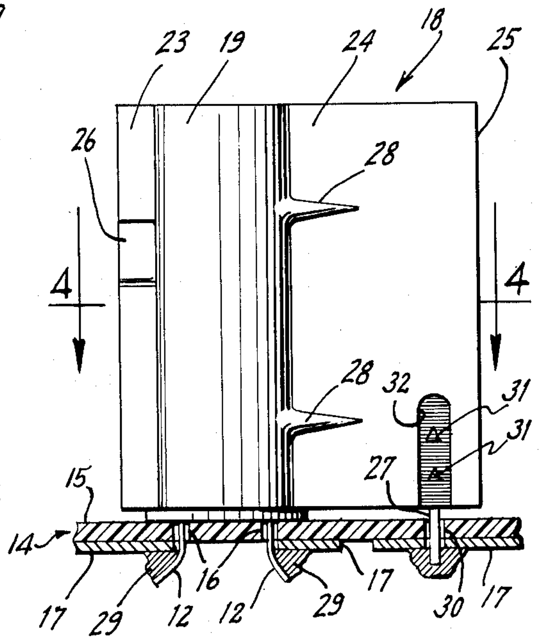
FIGURE 3 is an elevational view of the completed assembly of the heat dissipating apparatus and the semiconductive device.
Figure 4:
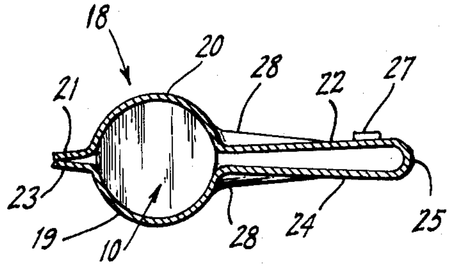
FIGURE 4 is a sectional view of the apparatus seen in FIGURE 3 and looking in the direction of arrows 4—4 applied thereto.
Figure 5:
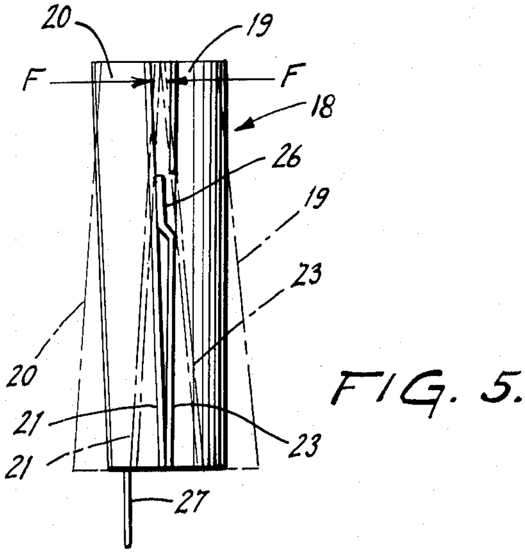
FIGURE 5 is an elevational view, looking at the left side of the heat dissipating device shown in FIGURE 2, and illustrating the manner in which the device is adjustable.

In particular accordance with the invention, and with reference also to FIGURES 3, 4 and 5, the novel heat dissipating appartus 18 includes an elongated, hollow, generally cylindrical member of thermally conductive, flexible and resilient material comprised of confronting semicylindrical sections 19 and 20. Semicylindrical section 20 includes diametrically opposed, radially outwardly extending flanges 21 and 22 confronting like flanges 23 and 24 of the other section 19 to form adjacent flange pairs. Confronting, paired flanges 22 and 24 are joined in hinge-like manner to one another by web portion 25, and spacer means 26 is provided to maintain the confronting, paired flanges 21 and 23 apart.

Spacer means 26 is disposed between flanges 21 and 23 and intermediate the ends of the generally cylindrical member. As illustrated in broken lines in FIGURE 5 the semicylindrical sections 19 and 20 of the member are capable of being flexed apart or spread at one end about spacer means 26 as a pivot, in response to moving the other ends of the semicylindrical sections 19 and 20 together by applied forces F—F. The interconnected flanges 22 and 24 provide a resilient restoring force opposing this flexure.

As best seen in FIGURE 5, spacer means 26 comprises a tab formed or "bent-up" in one of the confronting flanges, for example flange 23, and about which tab semicylindrical portions 19 and 20 and the confronting flange portions 21 and 23 are pivotable against the resilience of the interconnected flange portions 22 and 24. Reinforcing ribs 28 further are provided to strengthen the device and to maintain its dimensional tolerances.

A depending tab 27 is preferably provided for extension through an opening 30 in panel board 15, and into electrically and thermally conductive engagement with additional elements of printed wiring 17 disposed to the other side of panel board 15, so that in addition to radiation of heat from the relatively large surface area of heat dissipating apparatus 18 there is also some conduction of heat through depending tab 27 into the electrical circuit elements 17. In the illustrated preferred embodiment tab 27 is a separate element held in place by rivet means 31, with access to the "blind" sides thereof being provided by a slot 32 as illustrated. However, it will be appreciated that tab 27 may be formed integrally with the flange if desired.

Also, apparatus 18, due to its extensive surface area, readily cools device 10 by transferring heat to convectional air currents created by temperature differences between the various operating elements and the air. Apparatus 18 is adapted to this type of heat transfer since, for example, the confronting flange portions 22 and 24, as well as a major portion of sections 19 and 20, are spaced from one another. In such an arrangement, as is illustrated, where the device 10 is upright, a chimney effect is created by the above mentioned confronting spaced portions, which effect itself enhances creation of convectional cooling air currents.

To install apparatus 18, it is held in substantial alignment with the housing of transistor 10 as illustrated in FIGURE 2. Opposing forces are then applied to the upper regions of flanges 21 and 23 as indicated by arrows F—F in FIGURE 5, whereupon lower regions of the cylindrical sections 19 and 20 are spread as illustrated by the broken line showings thereof. Thereafter the apparatus is moved downwardly over the transistor 10 and released, resiliently to clamp the latter and to provide both thermal and electrical contact therewith. At the time of installation tab 27 also is inserted into aperture 30, followed by soldering of the tab to circuit 17 for the above described thermal and electrical contact.

Apparatus embodying the invention is characterized by ease of installation and removal in such fashion that virtually no forces are exerted on the relatively fragile leads of a transistor or on their connections to the printed wiring. Also, apparatus made in connection with the invention is readily adjustable to accommodate slight variations in sizes of the housings with which it is used.

It will be further appreciated that tab 27 enhances mechanical stability of the transistor 10, as well as the heat transfer apparatus 18, in addition to providing thermal and electrical conductivity, as previously described.

I claim:

1. Heat exchange apparatus for use with semi-conductive devices having generally cylindrical casings, said apparatus comprising: an elongated, hollow generally cylindrical member of thermally conductive material comprised of confronting semicylindrical sections each section having diametrically opposed, radially outwardly extending flanges confronting like flanges of the other section to form adjacent flange pairs, means providing resilient attachment of the flanges of one of said pairs and spacer means maintaining the confronting flanges of the other pair in slightly spaced relation, said spacer means being disposed intermediate end portions of said generally cylindrical member, end portions of said semicylindrical sections being spreadable about said spacer means as a pivot, in response to moving the opposite end portions toward one another, said resilient attachment providing for said last recited movement and the flanges of said one pair exerting a resilient restoring force opposing said movement.

2. Apparatus according to claim 1 and characterized in that said thermally conductive material comprises a flexible and resilient metal sheet, the recited means providing resilient attachment comprising a web of said metal extending between the recited flanges of one of said pairs.

3. Apparatus for transferring heat from a semiconductive device, comprising: a unitary sheet of flexible and resilient thermally conductive material including confronting plate portions interconnected by a hinge-like bent portion; said plate portions each having an outwardly curved section spaced laterally from said bent portion and cooperatively disposed as respects one another to form a generally tubular section extending generally parallel with said bent portion; and means for maintaining very slight spacing between free edge portions of said plate portions, said means for spacing disposed intermediate end portions of said generally tubular section and about which means said free edge portions and said curved plate sections are pivotable in response to moving opposed ends of said curved plate sections toward or away from one another.

4. In combination with a semiconductive device having a generally cylindrical casing, a unitary sheet of flexible and resilient thermally conductive material including confronting plate portions interconnected by a bent portion; said confronting plate portions each having an outwardly curved section spaced laterally from said bent portion and cooperatively disposed as respects one another to form a generally cylindrical section extending generally parallel with said bent portion, said curved sections engaging said cylindrical casing; and means for maintaining very slight spacing between free edge portions of said plate portions, said means for spacing disposed intermediate end portions of said generally tubular section and about which means said free edge portions and said curved plate sections are resiliently pivotable, thereby resiliently urging said curved sections into the recited engagement with said cylindrical casing.

5. The combination according to claim 4, wherein one of said confronting plate portions includes a tab extending therefrom in a direction substantially parallel with said bent portion, said semiconductive device having lead wires, and a panel board of electrically and thermally insulative material having electrical circuit means disposed along surfaces thereof, said lead wires and said tab being disposed in electrical and thermal contact with said electrical circuit means.

6. Heat exchange apparatus for an electrical device having a tubular casing, comprising: a pair of metallic side plates; each slide plate having a pair of side flanges and an elongated semi-tubular outwardly curved portion intermediate said flanges; a flexible and resilient member connecting one pair of opposed flanges along opposed edges thereof, thereby providing for resilient movements of said plates relative to one another; and means defining a spacer interposed between the free opposed flanges and operable as a pivot to provide for the recited hinged movement of said plates apart at one end, in response to forcible movements of said plates together at their other ends, said movement of said plates apart positioning said outwardly curved bent portions for frictional engagement with the tubular casing of an electrical device.

7. In combination with a semiconductive device having a generally tubular casing disposed generally vertically, clamping means including a lower portion closely engaging such device and an upper portion extending in a generally vertical direction away from said device to promote the convectional flow of air over surface portions of said clamping means and said device, said clamping means comprising: a sheet of flexible and resilient material that is thermally conductive and includes confronting plate portions interconnected by a bent portion; said confronting plate portions each having an outwardly curved section spaced laterally from said bent portion and cooperatively disposed to form a generally tubular section extending generally parallel with said bent portion, and closely engaging said tubular casing; and means disposed intermediate upper and lower end regions of said plate portions for maintaining sufficient spacing between free edges of said plate portions to accommodate convectional flow of air over both inner and outer surfaces of said unitary sheet to cool the latter and consequently said casing, said plate portions being pivotable about said means for spacing, thereby resiliently to urge said curved sections into the recited engagement with said tubular casing.

References Cited by the Examiner

UNITED STATES PATENTS

| | | | |
|---|---|---|---|
| 2,809,004 | 10/1957 | Kaufman et al. | 165—80 XR |
| 2,884,611 | 4/1959 | Gibson | 174—35.5 |

CHARLES SUKALO, *Primary Examiner.*